United States Patent [19]

Sudhakar et al.

[11] Patent Number: 5,556,824
[45] Date of Patent: Sep. 17, 1996

[54] HYDRODEAROMATIZATION OF HYDROCARBONS

[75] Inventors: Chakka Sudhakar, Wappingers Falls; Frank Dolfinger, Jr., Poughkeepsie; Max R. Cesar, Newburgh; Jeffrey G. Weissman, Wappingers Falls, all of N.Y.

[73] Assignee: Texaco Inc., White Plains, N.Y.

[21] Appl. No.: 498,861

[22] Filed: Jul. 6, 1995

Related U.S. Application Data

[62] Division of Ser. No. 122,986, Sep. 20, 1993, Pat. No. 5,449,452.

[51] Int. Cl.$^6$ .................................................. B01J 27/04
[52] U.S. Cl. ......................... 502/202; 502/185; 502/221; 502/204; 502/207
[58] Field of Search ............................ 502/185, 202, 502/204, 207

[56] References Cited

U.S. PATENT DOCUMENTS

| | | | |
|---|---|---|---|
| 1,965,956 | 7/1934 | Dunkel | 260/168 |
| 2,608,521 | 8/1952 | Hoog | 196/28 |
| 3,546,103 | 12/1970 | Hamner | 208/211 |
| 3,997,473 | 12/1976 | Schmitt, Jr. | 252/434 |
| 4,082,652 | 4/1978 | Voorhies | 208/216 |
| 4,176,051 | 11/1979 | Ternan et al. | 208/112 |
| 4,826,797 | 5/1984 | Chianelli | 502/221 |
| 4,992,404 | 2/1991 | Gruhl et al. | 502/185 |
| 5,449,452 | 9/1995 | Sudhakar et al. | 208/143 |

*Primary Examiner*—Helane Myers
*Attorney, Agent, or Firm*—Kenneth R. Priem; Cynthia L. Hunter

[57] ABSTRACT

A naphtha or a middle distillate hydrocarbon is hydrodearomatized by hydrotreating in the presence of a catalyst containing boron, non-noble Group VIII metal, and Group VIB metal on a carbon support.

4 Claims, No Drawings

HYDRODEAROMATIZATION OF HYDROCARBONS

This is a division of application Ser. No. 08/122,986, filed Sep. 20, 1993 now U.S. Pat. No. 5,449,452.

FIELD OF THE INVENTION

This invention relates to a hydroprocessing catalyst composition comprising Group VIB metal, Group VIII metal, and boron, supported on carbon, useful for hydrodesulfurization, hydrodenitrogenation, hydrodearomatization and hydrocracking of hydrocarbon oils. In addition, this invention relates to a process for hydrodearomatizing hydrocarbons including naphthas and middle distillate hydrocarbons. More particularly it relates to a process for treating a hydrocarbon diesel oil feedstock to convert its aromatic hydrocarbon components to non-aromatic hydrocarbon components.

BACKGROUND OF THE INVENTION

Aromatic hydrocarbons in fuels such as gasoline or diesel oil represent a source of atmospheric pollution. The aromatic content of middle distillates may be as high as 85 v %. An illustrative light straight run gas oil may for example be typically found to contain 30 v % aromatics. As environmental considerations become of greater concern, it is desirable to treat hydrocarbons such as naphthas and middle distillate hydrocarbons to decrease the content of undesirable aromatic components. Since the prior art hydroprocessing catalysts, typified by alumina supported cobalt/nickel/molybdenum/tungsten, do not have the catalytic activities necessary for producing a product having a very low aromatics content, it is desirable to find a hydrotreating catalyst with very high aromatics saturation activity.

U.S. Pat. No. 3,997,473 (and its divisional U.S. Pat. No. 4,032,435) is directed to hydrodesulfurization of petroleum residues by use of a catalyst comprising cobalt/nickel/molybdenum/tungsten on a carbon support, the carbon support being characterized by an average pore radius of at least 25 Angstroms and a BET Surface area of 200–800 m²/g. The catalyst of these patents has a loading of Group VIB metal "of at least 10 and up to about 20 weight percent expressed as metal oxide based on the weight of the catalyst support."

U.S. Pat. No. 4,082,652 is directed to treatment of heavy oils, to effect hydrodesulfurization by use of a molybdenum/nickel or molybdenum/cobalt on carbon catalyst. The catalyst preparation requires that the molybdenum be deposited first, then sulfided, and only then that the nickel or cobalt be added.

U.S. Pat. No. 3,546,103 is directed to the removal of metals and coke from hydrocarbon resids by use of, as pre-catalyst, metals of Group IIB or Group VIB plus Group VIII, on charcoal.

U.S. Pat. No. 3,367,862 is directed to desulfurization of heavy residual hydrocarbons by hydrolysis with water in the presence of catalyst on a char base.

U.S. Pat. No. 4,313,852 is directed to hydrotreating, particularly of coal liquids, in the presence of a sulfided molybdenum or tungsten on active carbon, with or without a second metallic component, in which catalysts the metal sulfides are substantially completely on the outer surface of the active carbon support. The carbon supported catalyst preparation according to U.S. Pat. No. 4,313,852 must involve direct deposition of metal sulfides on the carbon support and subsequent reduction to lower valent sulfides.

U.S. Pat. No. 3,812,028 is directed specifically to "hydrotreating" fossil fuels containing polynuclear aromatics such as asphaltenes, for converting the components boiling above 1000° F. to products boiling below 1,000° F. (this is actually hydrocracking), by the use of Group VI and/or Group VIII metals on carbon, at a hydrogen partial pressure in excess of 2,200 psig and at a temperature between 750° F. and 850° F.

U.S. Pat. No. 4,831,003 is directed to a catalyst composition, useful in hydrotreating processes, prepared by depositing a compound of a metal of Group II-B, IV-B, IV-A, V-A, VI-A, VII-A, or VIII-A onto a carbon support formed, simultaneous with the deposition, by partial combustion of an unsaturated hydrocarbon. The deposited metal is thereafter converted to an oxide or sulfide.

U.S. Pat. No. 5,051,389 is directed to a method for preparing a catalyst composition for hydroconversion processes wherein the catalyst composition is formed by depositing one or more metal and/or metal compounds from vapor phase, at elevated temperatures, onto a preformed carbon support which has maximum dimension in any direction of about 50 Angstroms to about 5,000 Angstroms. The catalysts made according to U.S. Pat. No. 5,051,389 have to be added to or combined with the carbonaceous material to be hydrotreated in only 50 to 5,000 parts per million concentration, for the hydroconversion process to take place (one-pass application).

U.S. Pat. No. 3,725,303 is directed to treating of aqueous solutions of oxy-sulfur compounds (such as sodium thiosulfate) by use of a catalyst containing molybdenum sulfide and cobalt sulfide on a carbon support.

U.S. Pat. No. 1,965,956 is directed to the hydrogenation of aromatic compounds to hydroaromatic compounds with a gas consisting substantially of hydrogen under a pressure of at least 100 atmospheres, at a temperature between 200° C. and 350° C., in the presence of a "mixed catalyst" comprising metal compounds of group 1, group 6 and group 8 of the periodic system, on a wide variety of catalyst supports including active charcoal. The catalysts of U.S. Pat. No. 1,965,956 can also contain "activating admixture" selected from compounds of elements of groups 2 to 5 and of group 7 of the periodic system.

U.S. Pat. No. 4,176,051 is directed to a process for catalytically hydrocracking a heavy hydrocarbon oil, wherein the heavy hydrocarbon oil is slurried with a particulate catalyst mass comprising aluminum compound coated coal and/or coke particles which may also be coated with a cobalt and/or a molybdenum compound, and then reacted with hydrogen.

U.S. Pat. No. 2,608,521 is directed to a process for the desulfurization of "sulfur bearing" hydrocarbon oils using "sulfactive hydrogenation catalysts". The "sulfactive hydrogenation catalysts" of U.S. Pat. No. 2,608,521 can consist of "oxides or sulfides of the transition metals", with or without stabilizers and promoters as the oxides and carbonates of a very large selection of metals, in combination with a large selection of various conventional supporting materials.

It is an object of this invention to provide a novel process and novel catalyst for hydrodearomatizing middle distillate hydrocarbons. It is also an object of this invention to provide a novel catalyst composition useful for hydroprocessing various hydrocarbon oils derived from petroleum, coal, shale, or oil sands. Other objects will be apparent to those skilled in the art.

STATEMENT OF THE INVENTION

In accordance with certain of its aspects, this invention is directed to a process for treating a charge hydrocarbon such as a naphtha or middle distillate hydrocarbon containing undesired aromatic components, sulfur, and nitrogen compounds, which comprises maintaining a bed of sulfided catalyst containing boron, a non-noble metal of Group VIII, and a metal of VIB on a carbon support;

passing a charge hydrocarbon in the presence of hydrogen into contact with said sulfided catalyst containing boron, a non-noble metal of Group VIII, and a metal of Group VIB on a carbon support at hydrotreating conditions thereby effecting hydrodearomatization of said charge hydrocarbon containing undesired aromatic components, and forming a product stream of hydrocarbon containing lesser quantities of undesired aromatic components; and recovering said product stream of hydrocarbon containing lesser quantities of undesired aromatic components.

DESCRIPTION OF THE INVENTION

The charge hydrocarbons which may be treated by the process of this invention include those which are commonly designated as naphthas, middle distillates or other heavier hydrocarbon feedstocks such as gas oils, vacuum gas oils, residua, shale oils, coal liquids, sand oils, etc. Typically naphthas may have an initial boiling point (IBP) of at least about 70° F. and typically 80° F.–200° F. by ASTM distillation #D86. The charge middle distillates may have an IBP of at least about 300° F., and commonly about 300° F.–480° F.

These charge hydrocarbons may include naphtha (IBP of 70° F.–200° F.), kerosene (IBP of 300° F.–340° F.), light gas oil (IBP of 340° F.–480° F.), etc.

Many of these charge middle distillates may have an aromatics content as high as 80 v %, typically 20 v %–80 v %, say 25 v %–75 v %. In addition to the undesired aromatics content, they may contain other undesirables such as sulfur (0.1 wt %–5 wt %, typically 1 wt %–4 wt %) and nitrogen (10–5,000 wppm, typically 0.001%–0.2 wt %).

A typical charge which may be treated by the process of this invention may be a light atmospheric gas oil (LAGO) having the following properties:

TABLE

| Property | Value |
| --- | --- |
| API Gravity | 32° |
| ASTM D86 Distillation: | |
| IBP °C. | 197 |
| 10% °C. | 263 |
| 50% °C. | 299 |
| 90% °C. | 344 |
| EP (End Point) °C. | 360 |
| Sulfur wt % | 0.71 |
| Nitrogen wppm | 500 |
| Aromatics wt % (ASTM D-5186) | 32 |

In practice of the process of this invention, the charge may be admitted to the catalyst bed at about 200° C.–450° C., preferably at 300° C.–410° C. say about 380° C., and 200–3,000 psig, preferably 400–2,500 psig, say 1,500 psig. Hydrogen is admitted at a flow rate of 200–10,000 SCFB, preferably 1,000–5,000 SCFB, say about 4,000 SCFB. Gas mixtures wherein hydrogen is the major component, say higher than about 60% by volume, may be employed instead of pure hydrogen gas. LHSV based on catalyst volume may be 0.1–10, preferably 0.5–4, say about 2.5.

The supported catalyst of this invention is preferably prepared on an activated carbon support. Granulated carbon blacks may also be employed as catalyst supports. Although it may be possible to utilize powdered carbon in a fluidized bed, it is preferred to utilize extrudates, spheres or granules of carbon in a packed bed or ebullated bed. The support carbon may be in the form of granules, pellets, spheres, or extrudates, and may also contain a refractory inorganic oxide as a minor component, say less than 30 wt. %. The Total Surface Area (Brunauer-Emmett-Teller, BET) of the carbon support is at least about 200 m$^2$/g, and typically between 200 m$^2$/g and 2,000 m$^2$/g, say 1,200 m$^2$/g. The Total Pore Volume (TPV) for nitrogen is at least about 0.3 cc/g, preferably 0.4–1.2 cc/g, say 0.8 cc/g. The Average Pore Diameter by nitrogen physisorption, is in the range of 12–100 Angstroms, preferably 16–50 Angstroms, say 30 Å. Preferably 20–80% of the total pore volume of the carbon support should exist in pores in the mesopore range (20–500 Å diameter).

Illustrative commercially available carbon pellets, granules, or extrudates which may be used as catalyst supports used in fixed beds in practice of the process of this invention may include:

TABLE

A. The Nuchar BX-7530 carbon (of the Westvaco Company) ⅛" diameter pellets having a surface area (BET) of 1128 m$^2$/g, a total pore volume (TPV) of 0.82 cc/g (for nitrogen), Average Pore Diameter estimated using the Wheeler equation $$\text{Pore Diameter (Å)} = [40{,}000 \times TPV \text{ (cc/g)}]/\text{Surface Area (m}^2\text{/g)}$$

of 29.2 Å, an apparent bulk density of 0.37 g/cc, and an ash content of less than 7 wt %.

B. The Norit RX carbon (of the Norit Company) acid-washed extrudate (0.8 mm diameter) having a surface area (BET) of 1474 m$^2$/g, a TPV of 0.79 cc/g (for nitrogen), Average Pore Diameter of 21.4 Å, an apparent bulk density of 0.41 g/cc, and an ash content of less than 4 wt %.

C. The Norit R carbon (of the Norit Company) extrudate (3 mm diameter) having a surface area (BET) of 1217 m$^2$/g, a TPV of 0.67 cc/g (for nitrogen), Average Pore Diameter of 22 Å, and an apparent bulk density of 0.41 g/cc.

D. The Atochem ACP carbon (of the Atochem Company) pellets (4 mm diameter) having a surface area (BET) of 997 m$^2$/g, a TPV of 0.59 cc/g (for nitrogen), Average Pore Diameter of 23.6 Å, and an apparent bulk density of 0.40 g/cc.

E. The Darco 12×20 LI carbon (acid washed carbon from American Norit Company) 12×20 mesh granules having a surface area (BET) of 688 m$^2$/g, a TPV of 0.76 cc/g (for nitrogen), Average Pore Diameter of 44.4 Å, and an apparent bulk density of 0.39 g/cc.

It is a particular feature of the process of this invention that the desired hydrodearomatization of hydrocarbons is attained by use of a catalyst prepared from a carbon which is particularly characterized by a BET surface area of at least about 200 m$^2$/g, by a Total Pore Volume of at least about 0.3 cc/g, and by an average Pore Diameter of at least 12 Å, which carbon has been loaded with 0.001–10 wt % boron, 1–50 wt % of VIB metal, and 0.1–15 wt % of non-noble Group VIII metal, based on the final catalyst weight.

The catalytic metals may be deposited on the carbon, in the form of inorganic, organic or organometallic compounds of the metals, either sequentially or simultaneously, by various processes including incipient wetness impregnation, equilibrium adsorption etc., from aqueous or non-aqueous media, or from vapor phase using volatile compounds of the metals. The catalysts can also be prepared by solid state synthesis techniques such as by grinding together the support and the metal compounds in a single step or in multiple steps, with suitable heat treatments The Group VIB metal may preferably be molybdenum or tungsten, present in the final catalyst, calculated as metal, in amount of 1–50 wt %, preferably 5–18 wt %, say 12 wt % for Cr or Mo and preferably 10–45 wt %, say about 37 wt % for W.

The non-noble Group VIII metal may be cobalt, iron or nickel, preferably nickel, present in the final catalyst, calculated as metal, in amount of 0.1–15 wt %, preferably 2–12 wt %, say about 7 wt %.

The boron may be present in the final catalyst, calculated as metal, in amount of 0.001–10 wt %, preferably 0.01–6 wt %, say 1 wt % of boron.

The Group VIB metal may be loaded onto the catalyst support from a preferably aqueous solution of ammonium heptamolybdate or of ammonium metatungstate. The Group VIII non-noble metal may be loaded onto the catalyst support preferably from an aqueous solution of nickel nitrate hexahydrate or cobalt nitrate hexahydrate.

The boron may be loaded onto the catalyst support from an inorganic, organometallic or organic compound of boron. Examples of typical boron compounds which may be used as a source of boron include boric acid or salts containing boron typified by borates ($BO_3^{-3}$) or tetraborates ($B_4O_7^{-2}$), boron halides, $B_2O_3$ and other oxides, boron alkoxides such as tri-n-butylborate and tri-n-amylborate, complexes of borane with nitrogen, oxygen or sulfur compounds, complexes of $BF_3$, boranes, fluoroborates, triethanolamine borate, trimethoxy boroxine $(CH_3O)_3B_2O_3$, etc. The preferred compounds are boric acid, and ammonium salts including $(NH_4)_2B_4O_7$.

Although the metals and boron may be added in any order, either in a single step or in multiple steps, it is preferred to deposit the boron first, then the Group VIB metal and thereafter the non-noble Group VIII metal with a drying/calcining step in between each loading. Alternatively, boron may be added along with the Group VIB metal in the first step.

In a preferred embodiment, carbon pellet support is contacted with a boron compound solution (preferably an aqueous solution), the boron compound being typically ammonium tetraborate $(NH_4)_2B_4O_7 \cdot 4H_2O$, in total solution volume enough to fill the pores of the carbon support to incipient wetness. The support bearing the boron compound is allowed to stand at room temperature for 0.5–4 hours say 2 hours and then heated at a rate of 0.3° C./min to 125° C. in air or nitrogen, maintained at that temperature for 2–48 hours, say 24 hours, and then cooled to room temperature over 2–6 hours, say 3 hours. Multiple depositions may be employed to prepare catalysts with desired boron loading.

The carbon pellet support bearing the boron component is then contacted with an aqueous solution of a salt of the Group VIB metal, preferably ammonium metatungstate, in amount to fill the pores to incipient wetness. The support bearing boron and the Group VIB metals is typically allowed to stand at room temperature for 0.5–4 hours, say 2 hours, and then heated in air or inert atmosphere at a rate of 0.3° C./min to 125° C., maintained at that temperature for 12–48 hours, say 24 hours, and then cooled to room temperature over 2–6 hours, say 3 hours. Multiple impregnation may be employed to prepare catalysts with desired Group VIB metal loading.

Thereafter the support bearing boron and Group VIB metal is contacted with aqueous solution of the non-noble Group VIII metal, preferably nickel nitrate hexahydrate, in amount to fill the pores to incipient wetness. The support bearing boron, Group VIB metal, and Group VIII metal is typically allowed to stand at room temperature for 0.5–4 hours, say 2 hours, and then heated in air or inert atmosphere, at a rate of 0.3° C./min to 125° C., maintained at that temperature for 12–48 hours, say 24 hours and then cooled to room temperature over 2–6 hours, say 3 hours. Multiple impregnations may be employed to prepare catalysts with desired Group VIII metal loading.

The catalyst so prepared contains 1–50 wt %, preferably 5–18 wt %, say 12 wt % of Group VIB metal (measured as metal); and 0.1–15 wt %, preferably 2–12 wt %, say 7 wt % of Group VIII metal (measured as metal); and 0.001–10 wt %, preferably 0.01–6 wt %, say 0.86 wt % boron (measured as boron). When the VIB metal is the preferred tungsten, it may be present in amount of 1–50 wt %, preferably 10–45 wt %, say 37 wt %.

The catalyst, bearing boron,-Group VIB, and non-noble Group VIII metals, is sulfided, preferably after loading into the fixed bed reactor. Sulfiding may typically be effected by passing hydrogen sulfide, carbon disulfide, dimethyl sulfide, etc. through the catalyst bed (preferably in a solvent, in the presence of hydrogen) at 300° C.–450° C., say at 350° C. and at 0–1000 psig, say at 0 psig for 2–24 hours, say 3 hours. Alternatively sulfiding may be carried out prior to loading the catalyst into the reactor. Ex-situ sulfiding can be done using any of the known techniques described in the literature. If sufficient amount of sulfur is incorporated into the catalyst using one of these ex-situ presulfiding techniques, activation of the catalyst might be accomplished by heating the catalyst in hydrogen flow in the reactor itself. When the hydrocarbon feed to be treated by the process of this invention contains sulfur (typically in amount of about 1 wt % or more) it may not be necessary to pre-sulfide the catalyst prior to use.

Practice of the process of this invention may be carried out by passing the charge naphtha or middle distillate hydrocarbon into contact with the sulfided catalyst at 200° C.–450° C., say 380° C. and 200–3,000 psig, say 1,500 psig, at LHSV (based on catalyst volume) of 0.1–10, say 2.5, with hydrogen gas flow rates of 200–10,000, say 4,000 SCFB. Gas mixtures wherein hydrogen is the major component, say higher than about 60% by volume, may be employed instead of pure hydrogen gas.

During hydrodearomatization, it is found that the aromatic content may be decreased from a charge content of 25–40 wt %, say 32 wt %, down to a product content of 10–16 wt %, say 13 wt %. In the case for example of a light atmospheric gas oil (LAGO) containing 32 wt % aromatics, this content may be reduced to approximately 10 wt % in a typical operation.

Practice of the process of this invention will be apparent to those skilled in the art from the following wherein all parts are parts by weight unless otherwise stated. An asterisk (*) indicates a control example.

EXAMPLE I

In this Example, the activated carbon support is the carbon designated A in the Table supra. This activated carbon is crushed and sieved; and the fraction which passes through 20-mesh and is retained on 40-mesh is used without further treatment to prepare the catalyst.

Ammonium tetraborate $(NH_4)_2B_4O_7.4H_2O$ (4.9 parts) is dissolved in deionized water (39 parts). Carbon, as 20–40 mesh particles (40 parts) are impregnated to incipient wetness with this ammonium tetraborate solution. The impregnated material is allowed to stand at room temperature for 2 hours in a hood. It is then heated at a rate of 0.3° C./min to 125° C. in air in an oven, left at that temperature for 24 hours, and then cooled slowly to room temperature over about 3 hours.

45.5 parts of ammonium metatungstate $(NH_4)_6H_2W_{12}O_{40}$ (AMT) is dissolved in 39 parts of fresh deionized water. The boron-containing material supra (total amount) is impregnated with this solution to incipient wetness. The mixture is left to stand at room temperature with occasional stirring for 2 hours and then heated slowly at a rate of 0.3° C./min to 125° C. in an oven in air. The material is maintained at that temperature for 24 hours then cooled to room temperature over about 3 hours.

The product so formed is impregnated to incipient wetness with a solution made of 33.1 parts of nickel (II) nitrate hexahydrate in 17 parts of deionized water. After standing at room temperature (with occasional stirring) for 2 hours, the material is heated slowly at a rate of 0.3° C./min to 125° C. in an oven in air. The material is maintained at that temperature for 24 hours and then cooled to room temperature over 3 hours.

The boron exists in the so prepared catalyst most probably as partially decomposed ammonium tetraborate. The tungsten exists in the so prepared catalyst most probably as partially decomposed ammonium metatungstate; and the nickel most probably as partially decomposed nickel nitrate. If all the ammonium tetraborate, ammonium metatungstate, and nickel nitrate have decomposed completely to oxides, the final catalyst would contain 0.86 wt % boron, 36.2 wt % tungsten, 7.1 wt % nickel, the balance being the carbon support, based on the final catalyst weight.

EXAMPLE II

In this Example, the activated carbon support is the carbon designated A in the Table supra. This activated carbon is crushed and sieved; and the fraction which passes through 20-mesh and is retained on 40-mesh is used without further treatment to prepare the catalyst.

Ammonium tetraborate $(NH_4)_2B_4O_7.4H_2O$ (2.3 parts) and 45.5 parts of ammonium metatungstate $(NH_4)_6H_2W_{12}O_{40}$ are dissolved together in 39 parts of deionized water. Carbon, as 20–40 mesh particles (40 parts) are impregnated to incipient wetness with this resulting solution. The impregnated material is allowed to stand at room temperature for 2 hours in a hood. It is then heated at a rate of 0.3° C./min to 125° C. in an oven, left at that temperature for 24 hours, and then cooled slowly to room temperature over about 3 hours.

The product so formed is impregnated to incipient wetness with a solution made of 33.1 parts of nickel (II) nitrate hexahydrate in 17 parts of deionized water. After standing at room temperature (with occasional stirring) for 2 hours, the material is heated slowly at a rate of 0.3° C./min to 125° C. in an oven in air. The material is maintained at that temperature for 24 hours and then cooled to room temperature over 3 hours.

The boron exists in the so prepared catalyst most probably as partially decomposed ammonium tetraborate. The tungsten exists in the so prepared catalyst most probably as partially decomposed ammonium metatungstate; and the nickel most probably as partially decomposed nickel nitrate. If all the ammonium tetraborate, ammonium metatungstate, and nickel nitrate have decomposed completely to oxides, the final catalyst would contain 0.41 wt % boron, 36.7 wt % tungsten, 7.2 wt % nickel, the balance being the carbon support, based on the final catalyst weight.

EXAMPLE III*

In this control Example, the activated carbon support is the carbon designated A in the Table supra. This activated carbon is crushed and sieved; and the fraction which passes through 20-mesh and is retained on 40-mesh is used without further treatment to prepare the catalyst.

45.5 parts of ammonium metatungstate $(NH_4)_6H_2W_{12}O_{40}$ is dissolved in 39.5 parts of fresh deionized water. Carbon, as 20–40 mesh particles (40 parts) are impregnated to incipient wetness with this ammonium metatungstate solution. The impregnated material is allowed to stand at room temperature for 2 hours in a hood. It is then heated at a rate of 0.3° C./min to 125° C. in air in an oven, left at that temperature for 24 hours, and then cooled slowly to room temperature over about 3 hours.

The product so formed is impregnated to incipient wetness with a solution made of 33.1 parts of nickel (II) nitrate hexahydrate in 19 parts of deionized water. After standing at room temperature (with occasional stirring) for 2 hours, the product is heated slowly at a rate of 0.3° C./min to 125° C. in an air oven. The material is maintained at that temperature for 24 hours and then cooled to room temperature over 3 hours.

The tungsten exists in the so prepared catalyst most probably as partially decomposed ammonium metatungstate; and the nickel most probably as partially decomposed nickel nitrate. If all the ammonium metatungstate, and nickel nitrate have decomposed completely to oxides, the final catalyst would contain 37 wt % tungsten, 7.5 wt % nickel, the balance being the carbon support, based on the final catalyst weight.

EXAMPLE IV–V*

In this series of Examples, the catalysts of Examples I–III* are evaluated for their ability to effect hydrodearomatization (HDAr), hydrodesulfurization (HDS), and hydrodenitrogenation (HDN) in a standard fixed bed hydrotreating reactor. In each Example, 20 volumes of catalyst are loaded into the hydrotreating reactor; and, after the air is purged (with helium); 150 volumes/minute of a sulfiding gas (10 v % hydrogen sulfide in hydrogen) is passed over the catalyst for 15 minutes at room temperature and 1 atmosphere pressure.

With the sulfiding gas flowing, the temperature of the reaction vessel is increased at 3° C./min to 350° C. at which temperature it is then maintained for 2 more hours. The temperature is then changed to the reaction temperature. Back pressure (400 psig) is then applied to the reactor; and the liquid feed flow is started at the desired LHSV. Once the hydrocarbon liquid passes beyond the catalyst bed, the flow of sulfiding gas is cut off, the flow of hydrogen is started at the desired rate, and the reactor pressure is increased to the desired pressure. At this time, it is considered that actual hydrotreating starts.

During the reaction, aromatic components of the charge are hydrodearomatized and the contents of nitrogen and sulfur are also decreased.

After about 20 hours on stream, the liquid products are collected and sparged with hydrogen gas to remove dissolved hydrogen sulfide and ammonia. Analyses are then conducted for sulfur, nitrogen, and aromatics.

The charge liquid to these catalysts is a light atmospheric gas oil (IAGO) having the following properties:

TABLE

| Property | Value |
| --- | --- |
| API Gravity | 32° |
| ASTM D86 Distillation: | |
| IBP °C. | 197 |
| 10% °C. | 263 |
| 50% °C. | 299 |
| 90% °C. | 344 |
| EP (End Point) °C. | 360 |
| Sulfur wt % | 0.71 |
| Nitrogen wppm | 500 |
| Aromatics wt % (ASTM D-5186) | 32 |

Sulfur content is determined by X-ray fluorescence spectroscopy (XRF) by ASTM Test D-2622.

Nitrogen content is determined by chemiluminescence technique.

Aromatics content is determined by Supercritical Fluid Chromatography (SFC) ASTM D-5186.

In Examples IV–V*, the reaction conditions employed (340° C., 800 psig, LHSV of 2.0, hydrogen flow rate of 2,000 SCFB) are chosen so that only partial hydrodesulfurization (HDS) and hydrodenitrogenation (HDN) occur. This permits one to compare the hydrodesulfurization and hydrodenitrogenation activities of different catalysts under identical reaction conditions, at conditions permitting a greater degree of discrimination between catalyst activities. Under these reaction conditions, the extent of hydrodearomatization observed was low (less than 7%).

The following Table summarizes the results on an equal catalyst volume basis:

TABLE

| | EXAMPLE | |
| --- | --- | --- |
| Catalyst | IV<br>I: Ni—W—B/Carbon | V*<br>III*: Ni—W/Carbon |
| Boron wt % | 0.86 | 0 |
| % HDS | 89.7 | 88.8 |
| % HDN | 56.8 | 56.0 |

From the above Table, the following conclusion may be drawn:

The presence of boron in the catalyst (Example IV) permits attainment of levels of hydrodesulfurization (HDS) and hydrodenitrogenation (HDN) activities which are comparable to those attained by Control Example V*.

EXAMPLE VI–VIII*

In Examples VI–VIII*, the reaction conditions employed (385° C., 1500 psig, LHSV of 2.5, hydrogen flow rate of 4,000 SCFB) are chosen so that significant hydrodearomatization (HDAr) reaction occurs. This permits one to compare the HDAr activities of different catalysts under identical reaction conditions, at conditions permitting a greater degree of discrimination between catalyst activities.

TABLE

| | EXAMPLE | | |
| --- | --- | --- | --- |
| Catalyst | VI<br>I: Ni—B—W/<br>Carbon | VII<br>II: Ni—(B +<br>W)/Carbon | VII*<br>III*: Ni—W/<br>Carbon |
| Boron wt % | 0.86 | 0.41 | 0 |
| % HDS | 99.8 | N.D. | 99.4 |
| % HDN | 99.4 | N.D. | 98.8 |
| % HDAr | 59.2 | 49.4 | 39.8 |
| $k_1$ (HDAr) | 4.48 | 3.41 | 2.54 | where, N.D. = Not Determined
and $k_1$(HDAr) is the first order rate constant for HDAr reaction.

From the above Table, the following conclusions may be drawn:

(i) the boron-containing catalysts of Examples VI–VII of this invention permit attainment of 59.2% and 49.4% hydrodearomatization—while the Control catalyst of Example VIII*, permits attainment of only 39.8% hydrodearomatization. This represents an improvement by a factor of almost 76%, since the rate constant for hydrodearomatization reaction desirably increases from 2.54 to 4.48;

(ii) these improvements are attained with no significant change in hydrodesulfurization or hydrodenitrogenation activity—both of which are at the 99+% level.

Results comparable to those of Example VI or Example VII may be attained if the boron is added to the catalyst from other boron compounds such as $H_3BO_3$, ammonium tetrafluoroborate, tri-isobutylborate, tri-ethanolamineborate, and $NH_3$:$BF_3$.

Results comparable to those of Example VI or Example VII may be obtained if the Group VIII metal is cobalt or iron or if the Group VIB metal is molybdenum.

It is a feature of the process of this invention that it permits significant improvements in hydrodearomatization (typically up to about 60% as distinguished from control runs of about 40%) with little or no change (i.e. extraordinarily high values of) in hydrodenitrogenation and hydrodesulfurization.

Although this invention has been illustrated by reference to specific embodiments, it will be apparent to those skilled in the art that various changes and modifications may be made which clearly fall within the scope of the invention.

What is claimed:

1. A supported, sulfided catalyst characterized by its ability to hydrodearomatize a hydrocarbon feedstock containing aromatics, nitrogen and greater than 0.5 wt % sulfur in the presence of hydrogen which consists essentially of an activated carbon support having a Total Surface Area (Brunaver-Emmett Teller, BET) of between $200^2$/g and 2000 $m^2$/g, a Total Pore Volume (TPV) for nitrogen of about 0.4–1.2 c clg, an Average Pore Diameter by nitrogen physisorption in the range of 16–50 Angstroms, and bearing (i) 1–50 wt % of at least one Group VIB metal selected from chromium, molybdenum and tungsten;

(ii) 0.1–15 wt % of at least one Group VIII metal; and (iii) 0.001–10 wt % boron.

2. A catalyst as claimed in claim 1 wherein said catalyst contains 5–18 wt % of at least one of chromium or molybdenum.

3. A catalyst as claimed in claim 1 wherein said catalyst contains 2–12 wt % of nickel.

4. A catalyst as claimed in claim 1 wherein said catalyst contains 0.01–6 wt % of boron.

* * * * *